United States Patent [19]

Pearson

[11] Patent Number: 4,940,427
[45] Date of Patent: Jul. 10, 1990

[54] ELECTRICAL TRAILER CONNECTOR RETAINER

[76] Inventor: Linnea H. Pearson, 249 E. Baker St., St. Paul, Minn. 55107

[21] Appl. No.: 408,520

[22] Filed: Sep. 18, 1989

[51] Int. Cl.⁵ .............................................. H01R 13/60
[52] U.S. Cl. ..................................... 439/501; 439/508
[58] Field of Search ........................... 439/34–36, 439/501, 503, 528; 191/12 R, 12.2, 12.4; 280/422

[56] References Cited

U.S. PATENT DOCUMENTS

| | | | |
|---|---|---|---|
| 4,182,005 | 1/1980 | Harrington | 439/501 X |
| 4,353,613 | 10/1982 | Carlow | 439/501 |
| 4,772,220 | 9/1988 | Hallier | 439/52 B |
| 4,842,524 | 6/1989 | Hopkins et al. | 439/35 X |

Primary Examiner—Eugene F. Desmond
Attorney, Agent, or Firm—Faegre & Benson

[57] ABSTRACT

A retainer for an electrical wire connector of the type commonly used to provide electrical connection of a trailer device to the electrical system of a towing vehicle. The retainer, mountable either on the bumper of the towing vehicle or on the tongue of the trailer device, permits the electrical wire connector, used for supplying electrical power to the trailer from the towing vehicle's electrical supply system, to be safely and conveniently stowed or retained when not in use and be readily available for electrical connection when needed.

2 Claims, 2 Drawing Sheets

ELECTRICAL TRAILER CONNECTOR RETAINER

FIELD OF THE INVENTION

This invention relates to a retainer for an electrical wire and connector of the type commonly used to provide electrical connections between a trailer and the electrical system of the towing vehicle. More particularly, this invention relates to such a retainer, mountable either on the bumper of the towing vehicle or on the tongue of the trailer, which permits the electrical wire connector, used for supplying electrical power or signals to the trailer signal lights from the towing vehicle's electrical system, to be safely and conveniently stowed or retained when not in use and readily available for connection when needed.

BACKGROUND OF THE INVENTION

When a vehicle, such as an automobile, truck or the like, is used to tow or trail a trailer device, such as a camper trailer, boat trailer, storage trailer, or the like, electrical power is made available to the trailer device by means of an electrical wire connector electrically connected to the towing vehicle's electrical supply system. Presently, when the electrical wire is not in use, it generally dangles dangerously and awkwardly from the rear bumper of the towing vehicle, where it is subject to being damaged. The present invention is specifically designed to provide a simple and efficient storage means for this electrical wire connector when not in use, and which allows the wire to be readily available for connection to a trailer.

DETAILED DESCRIPTION OF THE INVENTION

Figure 1:
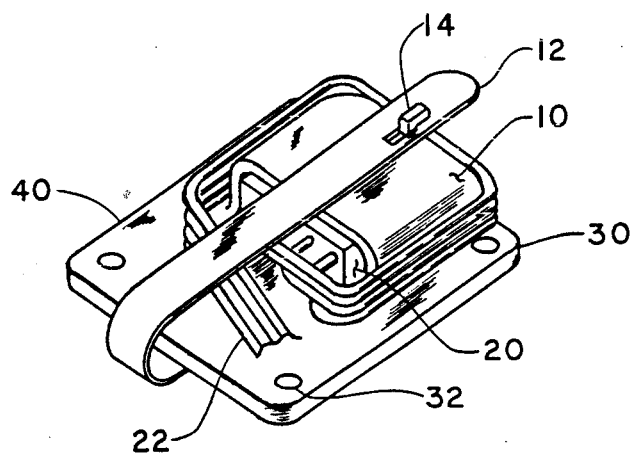
FIG. 1 is a perspective view of an electrical connector retaining device of the present invention, showing the electrical wire connector in stored position, ready for use when needed.

Referring to the drawings, it is seen that the electrical connector retaining device of the present invention comprises connector retaining means 10, wire retaining strap 12, strap retaining means 14, retainer mounting base 30 and mounting holes 32 suitable for mounting to the bumper of the towing vehicle or to the trailer hitch tongue.

Connector retaining means 10, strap retaining means 14 and retainer mounting base 30 may be formed of a suitable non-electrically conductive synthetic resin, such as polyethylene, and wire retaining strap 12 may be formed of a suitable non-conductive synthetic resin, such as nylon. Holder 40 is preferably rectangular and of dimensions to enable holder 40 to be mounted to the bumper of a towing vehicle or to the trailer hitch tongue of a trailer device to be trailingly attached to a towing vehicle. Connector retaining means 10 is preferably of a size to permit storage of an electrical wire connector of up to five wires, connectable to the electrical and signal system of the towing vehicle.

Figure 2:
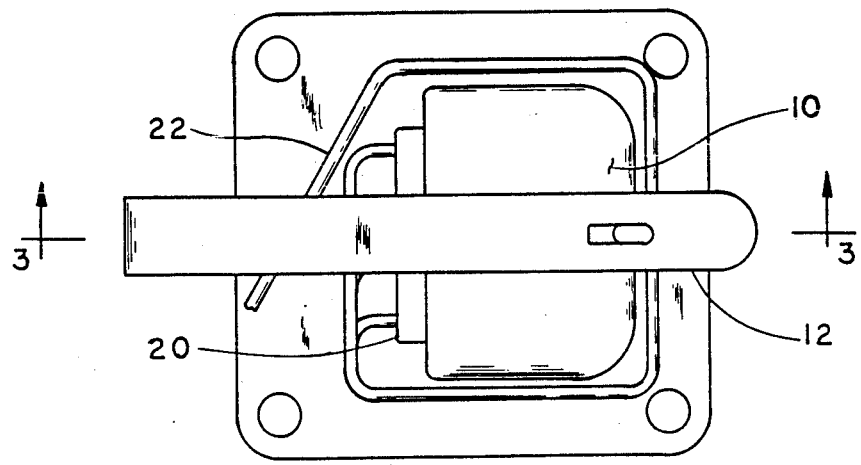
FIG. 2 is a top plan view of the device as shown in FIG. 1.
Figure 3:
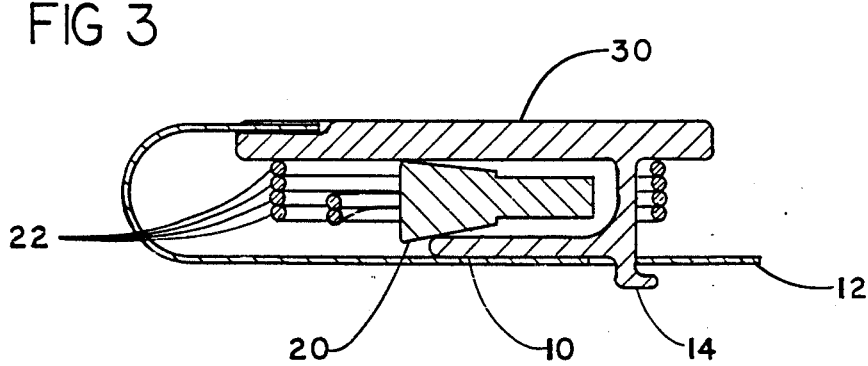
FIG. 3 is a vertical section view taken along line 3—3 of FIG. 2.

The manner in which the electrical wire connector is placed in the storage position is illustrated in FIGS. 2 and 3 and described below. With holder 40 mounted on the bumper of the towing vehicle and electrical wire connector 20 wired to the electrical and signal system of the towing vehicle, connector 20 is placed in connector retaining means 10. Connector wires 22 are then wrapped or wound around connector retaining means 10, taking up all slack in the connector wires 22. While connector wires 22 are held in the wound position, wire retaining strap 12 is pulled over connector wires 22 and hooked or otherwise secured onto strap retaining means 14. In FIGS. 1, 2 and 3, wire retaining strap 12 is hooked onto strap retaining means 14 by way of a slot in wire retaining strap 12. Wire retaining strap 12 thus holds connector 20 and connector wires 22 securely in place when not in use, readily available for electrical connection when needed.

In order to remove connector 20, the above described storing operation is reversed and the now disconnected connector 20 can then be plugged into the receptacle on the trailer to provide electrical connection.

From the foregoing description, it is seen that the elements of the invention cooperate in a novel manner to provide a compact storage place for an electrical wire connector and provide it protection from adverse elements of nature when not in use.

What is claimed is:

1. A retainer for securing a plug and a plurality of electrical conductors operatively connected to the plug said electrical conductors being operatively associated with the electrical system of a vehicle, said retainer comprising, in combination:
   a base plate;
   a plug receiving means mounted on the base plate for receiving an electrical plug inserted therein, said plug receiving means being constructed and arranged for supporting the excess length of electrical conductors projecting from the plug when the conductors are wound around the plug receiving means; and
   strap means affixed to the base constructed and arranged for releasable attachment to the plug receiving means for releasably retaining the electrical conductors wrapped around the plug receiving means.

2. A retainer according to claim 1, wherein the base plate and the plug receiving means around which the electrical conductors are wound are formed of non-electrically conductive synthetic resin.

* * * * *